3,548,031
SHAPABLE POLYVINYL ALCOHOL COMPOSITION
Yasuji Oyanagi and Kyoichiro Shibatani, Kurashiki, Japan, assignors to Kurashiki Rayon Co., Ltd., Kurashiki, Japan, a corporation of Japan
No Drawing. Filed Oct. 17, 1968, Ser. No. 768,504
Int. Cl. C08f 29/26, 29/30
U.S. Cl. 260—874                                     6 Claims

ABSTRACT OF THE DISCLOSURE

A shapable polyvinyl alcohol composition comprising 70 to 99 percent by weight of a crystalline polyvinyl alcohol having a swelling degree in water of not more than 3.0 and 30 to 1 percent by weight of a non-crystalline polyvinyl alcohol having a swelling degree in water of not less than 4.0 and a weight average degree of polymerization of not less than 300.

---

This invention relates to a shapable polyvinyl alcohol composition. More particularly, it relates to a polyvinyl alcohol composition which gives shaped articles having an excellent resistance to fatigue.

Large resistance to fatigue, i.e., less lowering of properties by repeated mechanical deformation, together with high strength and Young's modulus are often required of shaped articles obtained from polyvinyl alcohol such as fibers and films, like shaped articles obtained from other polymers. However, a polyvinyl alcohol composition capable of meeting this requirement has not yet come into existence.

An object of the invention is to provide a polyvinyl alcohol composition capable of giving shaped articles having satisfactory strength and Young's modulus and a remarkably large resistance to fatigue. Other objects of the invention will become apparent from the description which follows.

A polyvinyl alcohol composition which suits for these purposes is produced by blending 70 to 99 percent by weight of a crystalline polyvinyl alcohol having a swelling degree in water of not more than 3.0 with 30 to 1 percent by weight of a non-crystalline polyvinyl alcohol having a weight average polymerization degree of not less than 300 and a swelling degree in water of not less than 4.0.

It is known that polyvinyl alcohol takes a variety of molecular structures (such as streo-structure, 1,2-glycol content and branching) depending upon the method of production. By the differences of the molecular structure, large differences are observed in the properties of polyvinyl alcohol such as solubility in water, melting point and chemical reactivity. Since the "swelling degree in water" is a property which inclusively reflects such changes in molecular structures of polyvinyl alcohol, this term can be conveniently used in the invention to differentiate polyvinyl alcohols directly from one another. The swelling degree in water (S) is calculated from the Equation $S=(W_q-W_d)/W_d$. $W_q$ is the weight of the swelled film specimen measured after immersion in distilled water at 30° C. for 24 hours. $W_d$ is the weight of the same specimen measured after drying the swollen film at 100 to 110° C. The original film specimen which is 0.1 mm. in thick is obtained by evaporating a 1.7% wt. percent aqueous solution of polyvinyl alcohol in a disk made of polyvinyl chloride resin at 30° C. for 24 hours. and thereafter vacuum-drying at room temperature for 24 hours.

Polyvinyl alcohols having a swelling degree in water of not more than 3.0 come within the concept of crystalline polyvinyl alcohols, and these polyvinyl alcohols have a weight average polymerization degree of not less than about 500. Polyvinyl alcohols of the type now generally used commercially, that is, polyvinyl alcohols obtained by radical polymerization of vinyl acetate, have a swelling degree in water of 2.0 to 3.0, and are included in the above-mentioned crystalline polyvinyl alcohols. Syndiotactic polyvinyl alcohols, which are obtained by polymerization of vinyl ethers in a polar solvent at a low temperature such as −78° C. or by polymerization of vinyl trifluoroacetate or vinyl formate at a low temperature, have a swelling degree in water of not more than 1.5, and also belong to the above-mentioned type of polyvinyl alcohols.

Polyvinyl alcohols having a swelling degree in water of not less than 4.0 come within the concept of non-crystalline polyvinyl alcohols. For instance, isotactic polyvinyl alcohols and the high temperature polymerized polyvinyl alcohols belong to this type. Isotactic polyvinyl alcohols can be prepared by cationic polymerization of vinyl ethers such as t-butyl vinyl ether, benzyl vinyl ether and trimethylsilyl vinyl ether at a low temperature such as −78° C. in nonpolar solvents such as toluene and n-hexane. Since these polyvinyl alcohols are completely dissolved in water at 30° C., their swelling degree in water can be regarded as infinity ($\infty$). The high temperature polymerized polyvinyl alcohols are prepared, for instance, by radical polymerization of vinyl acetate at a temperature not lower than 80° C., and usually having a swelling degree in water slightly larger than 4.0.

When the foregoing crystalline polyvinyl alcohols are shaped into fibers or films without using any additives, the resulting shaped articles are often poor in resistance to fatigue although having excellent strength and Young's modulus. On the other hand, the non-crystalline polyvinyl alcohols mentioned above give only those shaped articles which, without additives, are unsatisfactory in all of the strength, Young's modulus and resistance to fatigue. However, if 70 to 99 percent by weight, preferably 75 to 95 percent by weight, of the crystalline polyvinyl alcohol is blended with 30 to 1 percent by weight, preferably 25 to 5 percent by weight, of the non-crystalline polyvinyl alcohol having a weight average polymerization degree of not less than 300, it is possible to increase the fatigue resistance of a shaped article to 5 to 10 times without substantially lowering the strength and Young's modulus which may be otbained by a crystalline polyvinyl accohol alone. This will be substantiated by the examples which appear later in the pages. If the ratio of the non-crystalline polyvinyl alcohol to be blended is less than one percent by weight, there is no appreciable effect of improvement, and if it exceeds 30 percent by weight, the strength and Young's modulus of the resulting shaped article tend to be on the decline. If the weight average polymerization degree of the non-crystalline polyvinyl alcohol is less than 300, the strength of the resulting shaped article decreases, and if its swelling degree in water is less than 4.0, the fatigue resistance of the resulting shaped article is not so much improved.

The polyvinyl alcohol composition of the invention may be shaped by either a known dry process or a known wet process. In any case, the above-mentioned result can be obtained. When fibers are prepared from the polyvinyl alcohol composition of the present invention, especially when the ratio of the non-crystalline polyvinyl alcohol in the composition is relatively high, better results will be obtained if the hot drawing temperature is slightly lower (220–235° C.) than the usually employed temperature (230–240° C.). Known additives, such as urea, formaldehyde, sulfates of fatty alcohols and polyesters of polyols, may, of course, be incorporated into the composition of the invention in order to improve the properties of shaped articles.

The following examples are presented to illustrate the invention specifically. In all the examples, the parts are by weight.

EXAMPLE 1

Eighty parts of a crystalline polyvinyl alcohol having a degree of polymerization of 1,600 (weight average degree of polymerization; this abbreviation will be used hereinafter) and a swelling degree in water of 2.37 was blended with 20 parts of isotactic polyvinyl alcohol having a degree of polymerization of 14,200 and a swelling degree in water of ∞. The resulting mixture was dissolved into water to form a 2.5 wt. percent aqueous solution. The aqueous solution was cast onto a glass plate at 25° C., and a 0.1 mm. thick film was prepared by evaporating water. The water content of this film was adjusted to one percent by weight, and the film was cut into a piece with a size of 1 mm. width and 10 cm. length. It was stretched to 10 times the original length at 204° C. The obtained fiber was tested in a room at a temperature of 20° C. and a humidity of 65%. The following results were obtained.

Strength—8.9 g./d.
Break elongation—8.1%
Young's modulus—230 g./d.
Number of bending until breakage—18,000 times For the sake of comparison, a fiber consisting only of a crystalline polyvinyl alcohol was prepared in the same manner as above, and was subjected to the same test. The results are as follows:

Strength—8.5 g./d.
Break elongation—7.8%
Young's modulus—240 g./d.
Number of bending until breakage—2,600 times The "number of bending until breakage" was measured under a load of 10 kg./mm.$^2$ with the use of MIT Type Folding Endurance Tester made by Toyo Seiki Co. This tester is constructed in accordance with ASTM and TAPPI standards, and is famous as a tester for measuring fatigue strength against repeated bending of such materials as plastics, leather and paper. Since values measured by this tester tend to depend on the condition of the apparatus at the time of measuring, importance should be attached more to relative values than to absolute values.

The crystalline polyvinyl alcohol used in this example was obtained by radical polymerization of vinyl acetate in methanol at 60° C., and thereafter saponifying the product with alkali to a degree of 99.98 percent. The isotactic polyvinyl alcohol was derived from poly-t-butyl vinyl ether obtained by cationic polymerization of t-butyl vinyl ether in n-hexane at −78° C.

EXAMPLE 2

Fibers were prepared in the same manner as in Example 1 by varying the proportion of the crystalline polyvinyl alcohol (C–PVA) and the isotactic polyvinyl alcohol (ISO–PVA) which are used in Example 1. The number of bending until breakage of each of the fibers obtained is as follows:

| Weight ratio of C–PVA/ISO–PVA | Number of bending until breakage |
|---|---|
| 90/10 | 7,600 |
| 70/30 | 5,000 |
| 60/40 | 1,200 |

EXAMPLE 3

A film having a thickness of 0.1 mm. was prepared in the same manner as in Example 1 from a blend of 90 parts of the same crystalline polyvinyl alcohol as in Example 1 and 10 parts of non-crystalline isotactic polyvinyl alcohol having a polymerization degree of 1,900 and swelling degree in water of ∞. The obtained film was stretched to 5 times at 205° C. The physical properties of the film were measured in the same manner as in Example 1. The results are as follows:

Strength—74 kg./mm.$^2$
Break elongation—17.1%
Number of bending until breakage—20,800 times For the sake of comparison, a film consisting only of a crystalline polyvinyl alcohol was prepared in the same manner as above, and tested. The results are as follows:

Strength—78 kg./mm.$^2$
Break elongation—18.9%
Number of bending until breakage—2,280 times

EXAMPLE 4

A blend of 80 parts of the same crystalline polyvinyl alcohol as in Example 1 and 20 parts of a high temperature polymerized polyvinyl alcohol having a swelling degree in water of 4.1 and a degree of polymerization of 1,470 obtained by polymerization of vinyl acetate at 85° C. was dissolved into water to form a 18 wt. percent aqueous solution. It was extruded into a coagulating bath containing caustic soda. The spun filament was wet drawn to 3 times the original length, subject to dry hot drawing to 2 times, and then shrunken at 235° C. by 20%.

The obtained filament was tested in the same manner as Example 1. The following results were obtained.

Strength—7.73 g./d.
Break elongation—19.4%
Young's modulus—93 g./d.

A 3,000 d. cord prepared from the filaments were tested with the above-mentioned MIT Tester under a load of 0.5 g./d. The number of bending until breakage was 1,200 times. For comparative purposes, the same test conducted with respect to a 3,000 d. cord consisting only of a crystalline polyvinyl alcohol revealed that the number of bending until breakage is 600.

EXAMPLE 5

A 0.1 mm. thick film was prepared from a blend of 90 parts of a crystalline polyvinyl alcohol having a degree of polymerization of 1,800 and swelling degree in water of 0.9 and 10 parts of the same isotactic polyvinyl alcohol as in Example 3. The film was cut into a piece having a width of 1 mm. and a length of 10 cm., and it was stretched to 10 times the original length at 205° C.

The obtained fiber was tested in the same manner as in Example 1, and the following results were obtained.

Strength—8.5 g./d.
Break elongation—6.1%
Number of bending until breakage—1,500 times For comparative purpose, a fiber consisting only of the abovementioned crystalline polyvinyl alcohol was prepared in the same manner, and tested. The results are as follows:

Strength—8.5 g./d.
Break elongation—5.8%
Number of bending until breakage—660 times The crystalline polyvinyl alcohol used in this example was prepared by complete saponification of poly(vinyl formate) obtained by radical polymerization of vinyl formate at −78° C. in methyl formate.

EXAMPLE 6

A blend of 80 parts of the crystalline polyvinyl alcohol of Example 1 and 20 parts of the high temperature polymerized polyvinyl alcohol of Example 4 was dissolved into water to form a 2.5 wt. percent aqueous solution. The solution was poured onto a glass plate to form a film having a thickness of 0.1 mm. The film was stretched to 10 times at 204° C. The physical properties of the film measured in the same manner as in Example 1 are as follows:

Strength—95 kg./mm.²
Break elongation—9.4%
Number of bending until breakage—6,780 times For the sake of comparison, a film prepared only from the said crystalline polyvinyl alcohol in the same manner as above and a film prepared in the same manner as above from a blend of 60 parts of the said crystalline polyvinyl alcohol and 40 parts of the said high temperature polymerized polyvinyl alcohol were subjected to the same test. It was found that the number of bending until breakage was 2,600 times for the former, and 490 times for the latter.

We claim:

1. A shapable polyvinyl alcohol composition comprising 70 to 99 percent by weight of a crystalline polyvinyl alcohol having a swelling degree in water of not more than 3.0 and 30 to 1 percent by weight of a non-crystalline polyvinyl alcohol having a swelling degree in water of not less than 4.0 and a weight average degree of polymerization of not less than 300.

2. A shapable polyvinyl alcohol composition comprising 75 to 95 percent by weight of a crystalline polyvinyl alcohol having a swelling degree in water of not more than 3.0 and 25 to 5 percent by weight of a non-crystalline polyvinyl alcohol having a swelling degree in water of not less than 4.0 and a weight average degree of polymerization of not less than 300.

3. The composition according to claim 1 wherein the crystalline polyvinyl alcohol is prepared by radical polymerization of vinyl acetate.

4. The composition according to claim 1 wherein the crystalline polyvinyl alcohol is a syndiotactic polyvinyl alcohol.

5. The composition according to claim 1 wherein the non-crystalline polyvinyl alcohol is an isotactic polyvinyl alcohol.

6. The composition according to claim 1 wherein the non-crystalline polyvinyl alcohol is a high temperature polymerized polyvinyl alcohol.

References Cited

UNITED STATES PATENTS

| 2,340,866 | 2/1944 | Dangelmajer | 260—29.6 |
| 2,909,502 | 10/1959 | Matsumoto et al. | 260—874 |
| 3,106,543 | 10/1963 | Milne | 260—874 |

SAMUEL H. BLECH, Primary Examiner

U.S. Cl. X.R.

260—29.6, 89.1, 91.3, 873